(12) United States Patent
Hommura et al.

(10) Patent No.: US 9,508,463 B2
(45) Date of Patent: Nov. 29, 2016

(54) ELECTROLYTE MATERIAL, LIQUID COMPOSITION AND MEMBRANE/ELECTRODE ASSEMBLY FOR POLYMER ELECTROLYTE FUEL CELL

(75) Inventors: Satoru Hommura, Chiyoda-ku (JP);
Susumu Saito, Chiyoda-ku (JP);
Tetsuji Shimohira, Chiyoda-ku (JP);
Atsushi Watakabe, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 1828 days.

(21) Appl. No.: 12/790,391

(22) Filed: May 28, 2010

(65) Prior Publication Data

US 2010/0304271 A1    Dec. 2, 2010

Related U.S. Application Data

(60) Provisional application No. 61/299,563, filed on Jan. 29, 2010.

(30) Foreign Application Priority Data

May 29, 2009   (JP) ................. 2009-130361

(51) Int. Cl.
*H01B 1/12* (2006.01)
*H01M 8/10* (2016.01)
*C08F 216/14* (2006.01)

(52) U.S. Cl.
CPC ......... *H01B 1/122* (2013.01); *C08F 216/1408* (2013.01); *H01M 8/1023* (2013.01); *H01M 8/1039* (2013.01); *H01M 8/1081* (2013.01); *Y02E 60/521* (2013.01); *Y02P 70/56* (2015.11)

(58) Field of Classification Search
None
See application file for complete search history.

(56) References Cited

U.S. PATENT DOCUMENTS 4,973,714 A    11/1990   Krespan
7,429,428 B2    9/2008   Watakabe
(Continued)

FOREIGN PATENT DOCUMENTS

EP    1 583 106 A1    10/2005
JP    2005-314388    11/2005
(Continued)

OTHER PUBLICATIONS

U.S. Appl. No. 13/214,273, filed Aug. 22, 2011, Watakabe, et al.
(Continued)

*Primary Examiner* — Barbara Gilliam
*Assistant Examiner* — Robert S Carrico
(74) *Attorney, Agent, or Firm* — Oblon, McClelland, Maier & Neustadt, L.L.P.

(57) ABSTRACT

It is to provide an electrolyte material with which an increase in the water content can be suppressed even when the ion exchange capacity of a polymer having repeating units based on a monomer having a dioxolane ring is high; and a membrane/electrode assembly excellent in the power generation characteristics under low or no humidity conditions and under high humidity conditions.

It is to use an electrolyte material, which comprises a polymer (H) having ion exchange groups converted from precursor groups in a polymer (F), and having an ion exchange capacity of at least 1.35 meq/g dry resin, the polymer (F) having repeating units (A) based on a perfluoromonomer having a precursor group of an ion exchange group and a dioxolane ring and repeating units (B) based on a perfluoromonomer having no precursor group and having a dioxolane ring, and having a TQ of at least 200° C., which is a temperature at which the melt volume rate becomes 100 mm³/sec when the polymer (F) is subjected to melt-extrusion under an extrusion pressure condition of 2.94 MPa from a nozzle having a length of 1 mm and an inner diameter of 1 mm.

13 Claims, 1 Drawing Sheet

(56) References Cited

U.S. PATENT DOCUMENTS

2002/0142207 A1* 10/2002 Watakabe et al. .............. 429/33
2005/0266291 A1* 12/2005 Watakabe ....................... 429/33

FOREIGN PATENT DOCUMENTS

| JP | 2006-290779 | 10/2006 |
| JP | 2009-40909 | 2/2009 |
| WO | WO 03/037885 A1 | 5/2003 |
| WO | WO 2004/097851 A1 | 11/2004 |
| WO | WO 2005/037818 A1 | 4/2005 |
| WO | WO 2006/046620 A1 | 5/2006 |
| WO | WO 2009/125795 A1 | 10/2009 |

OTHER PUBLICATIONS

U.S. Appl. No. 13/563,802, filed Aug. 1, 2012, Watakabe, et al.
Extended Search Report issued Sep. 10, 2013 in European Application No. 10780582.2.

* cited by examiner

ELECTROLYTE MATERIAL, LIQUID COMPOSITION AND MEMBRANE/ELECTRODE ASSEMBLY FOR POLYMER ELECTROLYTE FUEL CELL

BACKGROUND OF THE INVENTION

1. Field of the Invention

The present invention relates to an electrolyte material for a polymer electrolyte fuel cell, a liquid composition comprising the electrolyte material, and a membrane/electrode assembly for a polymer electrolyte fuel cell containing the electrolyte material in a catalyst layer.

2. Discussion of Background

As an electrolyte material contained in a catalyst layer of a membrane/electrode assembly for a polymer electrolyte fuel cell, the following polymer (1) has been known.

A polymer (1) having sulfonic acid groups (—$SO_3H$ groups) converted from —$SO_2F$ groups in a polymer having repeating units based on a compound represented by the following formula (m3) and repeating units based on tetrafluoroethylene (hereinafter referred to as TFE):

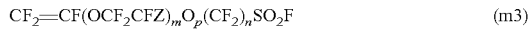

$$CF_2=CF(OCF_2CFZ)_mO_p(CF_2)_nSO_2F \quad (m3)$$

wherein Z is a fluorine atom or a trifluoromethyl group, m is an integer of from 0 to 3, p is 0 or 1, and n is from 1 to 12, provided that m+p>0.

A polymer electrolyte fuel cell is required to be operated under low humidity conditions where the relative humidity of the reaction gas (fuel gas and oxidant gas) is low, and even under no humidity conditions, in order to simplify the fuel cell system or to reduce the cost. In order to obtain sufficient power generation characteristics (such as output voltage) under low or no humidity conditions, it is required to increase the proton conductivity of the electrolyte material contained in the catalyst layer, i.e. to increase the ion exchange capacity of the electrolyte material.

However, if the ion exchange capacity of the polymer (1) is increased, that is, the proportion of repeating units based on the compound represented by the formula (m3) is increased, the water content (water absorptivity) of the polymer (1) is increased, and accordingly, under high humidity conditions where the relative humidity of the reaction gas is high, clogging of pores (flooding) by condensation of water vapor is likely to occur in the catalyst layer. Therefore, it is difficult to increase the ion exchange capacity.

On the other hand, as the electrolyte material, a polymer having a cyclic structure in its molecule has been known. It may, for example, be a polymer (2) having sulfonic acid groups (—$SO_3H$ groups) converted from —$SO_2F$ groups in a polymer having repeating units based on a perfluoromonomer having a —$SO_2F$ group and a dioxolane ring and repeating units based on a perfluoromonomer having no —$SO_2F$ group and having a dioxolane ring (Patent Document 1).

A polymer electrolyte fuel cell employing the polymer (2) as the electrolyte material of the catalyst layer is characterized in that it is excellent in the power generation characteristics as compared with one employing the polymer (1). In order to obtain higher performance under low or no humidity conditions, it is effective to increase the ion exchange capacity of the polymer (2). However, by merely increasing the ion exchange capacity of the polymer (2), the water content (water absorptivity) of the polymer (2) is drastically increased. Accordingly, under high humidity conditions where the relative humidity of the reaction gas is high, flooding is likely to occur, whereby the power generation characteristics (such as output voltage) tend to be decreased, and no sufficient characteristics of the polymer (2) can be obtained.

Patent Document 1: WO2004/097851

SUMMARY OF THE INVENTION

The present invention provides an electrolyte material with which an increase in the water content can be suppressed even when the ion exchange capacity of a polymer having repeating units based on a monomer having a dioxolane ring is increased; a membrane/electrode assembly excellent in the power generation characteristics under low or no humidity conditions and under high humidity conditions; and a liquid composition suitable for formation of a catalyst layer in the membrane/electrode assembly.

The electrolyte material of the present invention comprises a polymer (H) having ion exchange groups converted from precursor groups in the following polymer (F), and having an ion exchange capacity of at least 1.35 meq/g dry resin:

polymer (F): a polymer which has repeating units (A) based on a perfluoromonomer having a precursor group of an ion exchange group and a dioxolane ring and repeating units (B) based on a perfluoromonomer having no ion exchange group nor its precursor group and having a dioxolane ring, and which has a TQ as defined below of at least 200° C.:

TQ: a temperature at which the melt volume rate becomes 100 mm³/sec, when the polymer (F) is subjected to melt-extrusion under an extrusion pressure condition of 2.94 MPa from a nozzle having a length of 1 mm and an inner diameter of 1 mm.

The ion exchange groups of the polymer (H) are preferably groups represented by the following formula (g1):

$$—(SO_2X(SO_2R^f)_a)^-M^+ \quad (g1)$$

wherein $M^+$ is $H^+$, a monovalent metal cation or an ammonium ion in which at least one hydrogen atom may be substituted by a hydrocarbon group, $R^f$ is a linear or branched perfluoroalkyl group which may have an etheric oxygen atom, and X is an oxygen atom, a nitrogen atom or a carbon atom, provided that when X is an oxygen atom, a=0, when X is a nitrogen atom, a=1, and when X is a carbon atom, a=2.

It is preferred that at least one type of the repeating units having ion exchange groups converted from the precursor groups in the repeating units (A) are repeating units represented by the following formula (u1):

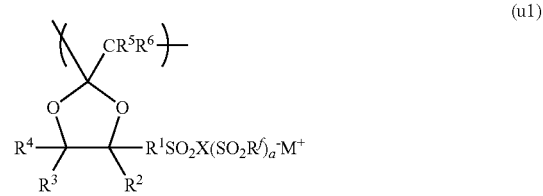

(u1)

wherein $R^1$ is a bivalent perfluoroorganic group which may have an etheric oxygen atom, and each of $R^2$ to $R^6$ which are independent of one another, is a monovalent perfluoroorganic group which may have an etheric oxygen atom, or a fluorine atom.

It is preferred that $R^5$ and $R^6$ are a fluorine atom.

It is preferred that $M^+$ is $H^+$.

It is preferred that at least one type of the repeating units represented by the above formula (u1) are repeating units represented by the following formula (u1-1):

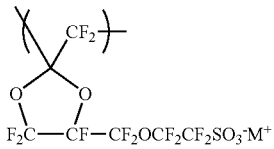

(u1-1)

It is preferred that at least one type of the repeating units (B) are repeating units represented by the following formula (u2):

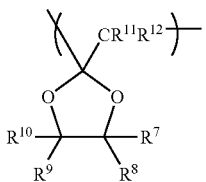

(u2)

wherein each of $R^7$ to $R^{12}$ which are independent of one another, is a monovalent perfluoroorganic group which may have an etheric oxygen atom, or a fluorine atom.

It is preferred that at least one type of the repeating units represented by the above formula (u2) are repeating units represented by the following formula (u2-1):

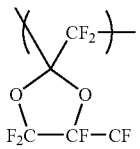

(u2-1)

The liquid composition of the present invention comprises a dispersion medium and the electrolyte material of the present invention dispersed in the dispersion medium, wherein the dispersion medium contains an organic solvent having a hydroxy group.

The membrane/electrode assembly for a polymer electrolyte fuel cell of the present invention comprises an anode having a catalyst layer containing a proton conductive polymer, a cathode having a catalyst layer containing a proton conductive polymer, and a polymer electrolyte membrane disposed between the anode and the cathode, wherein the proton conductive polymer contained in the catalyst layer of at least one of the cathode and the anode is the electrolyte material of the present invention.

With the electrolyte material of the present invention, an increase in the water content can be suppressed even when the ion exchange capacity of a polymer having repeating units based on a monomer having a dioxolane ring is increased.

The membrane/electrode assembly of the present invention is excellent in the power generation characteristics under low or no humidity conditions and under high humidity conditions.

The liquid composition of the present invention is suitable for formation of a catalyst layer in the membrane/electrode assembly of the present invention.

DETAILED DESCRIPTION OF THE INVENTION

Figure 1:
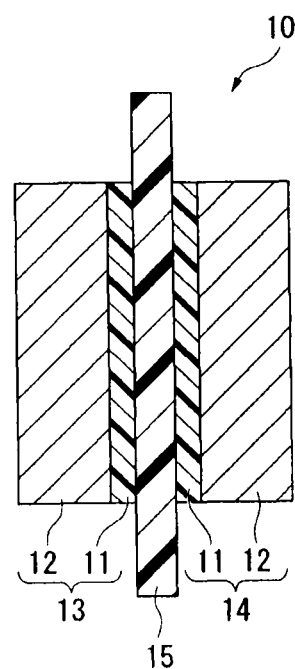
FIG. 1 is a cross section illustrating one example of a membrane/electrode assembly of the present invention.

In the present specification, repeating units represented by the formula (u1) will be referred to as units (u1). The same applies to repeating units represented by other formulae.

Further, in the present specification, a compound represented by the formula (m1) will be referred to as a compound (m1). The same applies to compounds represented by other formulae.

Further, in the present specification, a group represented by the formula (g1) will be referred to as a group (g1). The same applies to groups represented by other formulae.
<Electrolyte Material>

The electrolyte material of the present invention comprises a polymer (H) having ion exchange groups converted from precursor groups in a polymer (F).
(Polymer (F)):

The polymer (F) is a polymer having specific repeating units (A) and specific repeating units (B), and as the case requires, other repeating units (C).
Repeating Units (A):

Repeating units (A) are repeating units based on a perfluoromonomer (hereinafter sometimes referred to as a monomer (a)) having a precursor group of an ion exchange group and a dioxolane ring.

Repeating units mean units derived from a monomer formed by polymerization of the monomer. The repeating units may be units directly formed by the polymerization reaction, or may be units having part of the units converted to another structure by treating the polymer.

A monomer is a compound having a polymerizable carbon-carbon double bond.

A precursor group is a group capable of being converted to an ion exchange group by a known treatment such as hydrolysis or treatment for conversion to an acid form. Such a precursor group may, for example, be a —SO$_2$F group.

A dioxolane ring is a ring having a skeleton represented by the following formula (s1). The dioxolane ring does not include a ring having a skeleton represented by the following formula (s2) in which the carbon-carbon bond constituting the ring is a double bond.

(s1)

(s2)

The monomer (a) is preferably a compound (m1) from the viewpoint of high reactivity at the time of the polymerization.

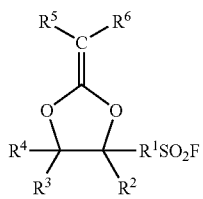

(m1)

$R^1$ is a bivalent perfluoroorganic group which may have an etheric oxygen atom. The organic group is a group having at least one carbon atom. The bivalent perfluoroorganic group is preferably a perfluoroalkylene group. In a case where the perfluoroalkylene group has an etheric oxygen atom, it may have one or more such oxygen atoms. Further, such an oxygen atom may be inserted between the carbon-carbon bond of the perfluoroalkylene group, or may be inserted at the terminal of the carbon atom bond. The perfluoroalkylene group may be linear or branched, and is preferably linear.

Each of $R^2$ to $R^6$ which are independent of one another, is a monovalent perfluoroorganic group which may have an etheric oxygen atom, or a fluorine atom. The monovalent perfluoroorganic group is preferably a perfluoroalkyl group. In a case where the perfluoroalkyl group has an etheric oxygen atom, it may have one or more such oxygen atoms. Further, such an oxygen atom may be inserted between the carbon-carbon bond of the perfluoroalkyl group, or may be inserted at the terminal of the carbon atom bond. The perfluoroalkyl group may be linear or branched, and is preferably linear.

It is preferred that at least one of $R^5$ and $R^6$ is a fluorine atom, and it is more preferred that both of them are a fluorine atom, in view of high polymerizability.

The compound (m1) is particularly preferably a compound (m1-1) in view of easiness of preparation and high polymerizability.

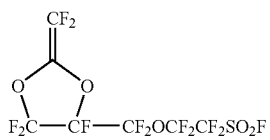

(m1-1)

The compound (m1) can be prepared by a method disclosed in WO2003/037885, JP-A-2005-314388, JP-A-2009-040909, etc.

Repeating Units (B):

Repeating units (B) are repeating units based on a perfluoromonomer (hereinafter sometimes referred to as a monomer (b)) having no ion exchange group nor its precursor group and having a dioxolane ring.

The ion exchange group is a group having H+, a monovalent metal cation, an ammonium ion or the like. The ion exchange group may, for example, be a group (g1) described hereinafter.

The monomer (b) is preferably a compound (m2) from the viewpoint of high reactivity at the time of the polymerization.

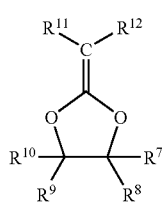

(m2)

Each of $R^7$ to $R^{12}$ which are independent of one another, is a monovalent perfluoroorganic group which may have an etheric oxygen atom, or a fluorine atom. The monovalent perfluoroorganic group is preferably a perfluoroalkyl group. In a case where the perfluoroalkyl group has an etheric oxygen atom, it may have one or more such oxygen atoms. Further, such an oxygen atom may be inserted between the carbon-carbon bond of the perfluoroalkyl group, or may be inserted at the terminal of the carbon atom bond. The perfluoroalkyl group may be linear or branched, and is preferably linear.

It is preferred that at least one of $R^{11}$ and $R^{12}$ is a fluorine atom, and it is more preferred that both of them are a fluorine atom, in view of high polymerizability.

The compound (m2) is particularly preferably a compound (m2-1) in view of easiness of preparation and high polymerizability.

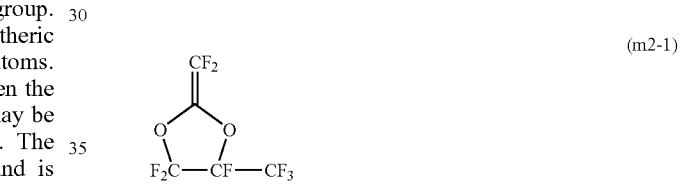

(m2-1)

As the monomer (b), it is possible to use a perfluoromonomer (hereinafter sometimes referred to as a monomer (b')) having no ion exchange group nor its precursor group, having a dioxolane ring and having one polymerizable carbon-carbon double bond, and a perfluoromonomer (hereinafter sometimes referred to as a monomer (b")) having no ion exchange group nor its precursor group, having a dioxolane ring and having two or more polymerizable carbon-carbon double bonds in combination. By polymerizing three monomers i.e. the monomer (a), the monomer (b') and the monomer (b"), the molecular weight, i.e. TQ of the polymer (F) can be increased.

The monomer (b") is preferably a compound (m2").

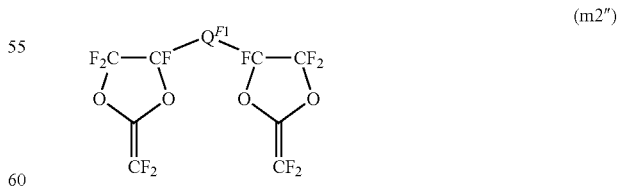

(m2")

wherein $Q^{F1}$ is a single bond, an oxygen atom, or a $C_{1-10}$ perfluoroalkylene group which may have an etheric oxygen atom.

The compound (m2") is preferably compounds (m2"-1) to (m2"-6) in view of easiness of preparation and high polymerizability.

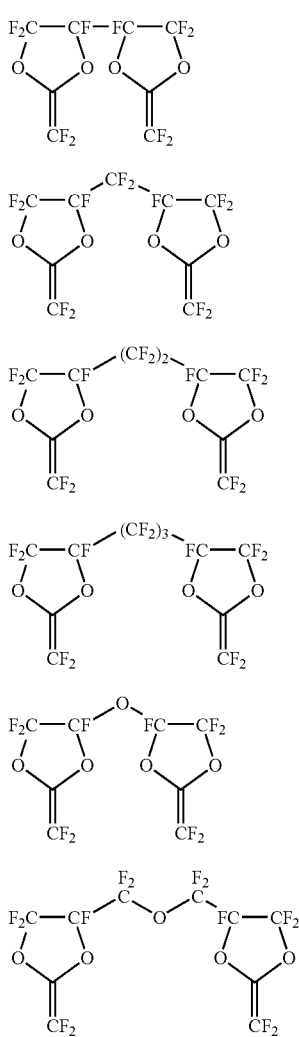

(m2″-1)

(m2″-2)

(m2″-3)

(m2″-4)

(m2″-5)

(m2″-6)

The amount of addition of the monomer (b″) is preferably from 0.001 to 50 mol % based on 100 mol % of all monomers (the total of the monomer (a), the monomer (b′) and the monomer (b″)) constituting the polymer (F). If it is less than 0.001 mol %, the effect of increasing the molecular weight will be low, and if it is larger than 50 mol %, the molecular weight tends to be too high, and preparation of a liquid composition in the subsequent step will be difficult.

Other Repeating Units (C):

Other repeating units (C) are repeating units based on a monomer (hereinafter sometimes referred to as a monomer (c)) other than the above perfluoromonomer having a dioxolane ring.

The monomer (c) may, for example, be TFE, chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene) or a perfluoro(alkyl vinyl ether). The monomer (c) is particularly preferably TFE. TFE, which has high crystallinity, has an effect of suppressing swelling when the polymer (H) contains water, and can reduce the water content of the polymer (H).

Further, as the monomer (c), a perfluoromonomer (hereinafter sometimes referred to as a monomer (c″)) having two or more polymerizable carbon-carbon double bonds may also be used. By use of the monomer (c″), TQ of the polymer (F) can be increased, and an effect of suppressing the water content of the polymer (H) can be obtained.

The monomer (c″) may, for example, be a compound (m5).

$$CF_2=CFOR^{f3}OCF=CF_2 \quad (m5)$$

wherein $R^{f3}$ is a linear or branched perfluoroalkylene group which may have an etheric oxygen atom.

The compound (m5) is preferably compounds (m5-1) to (m5-3) in view of easiness of preparation.

$$CF_2=CFOCF=CF_2 \quad (m5-1)$$

$$CF_2=CFO(CF_2)_hOCF=CF_2 \quad (m5-2)$$

$$CF_2=CF[OCF_2CF(CF_3)]_iO(CF_2)_k[OCF(CF_3)CF_2]_jOCF=CF_2 \quad (m5-3)$$

wherein each of h and k is an integer of from 2 to 8, and each of i and j which are independent of each other, is an integer of from 0 to 5, provided that i+j≥1.

The amount of addition of the monomer (c″) is preferably from 0.001 to 20 mol % based on 100 mol % of all the monomers (the total of the monomer (a), the monomer (b) and the monomer (c)) constituting the polymer (F). If it is less than 0.001 mol %, no sufficient effect of increasing the molecular weight will be obtained, and if it is larger than 20 mol %, production of the polymer (F) will be difficult due to the difference of the reactivity with the monomer (a) and the monomer (b).

Ion Exchange Capacity:

The ion exchange capacity of the polymer (H) is at least 1.35 meq/g dry resin, preferably from 1.4 to 3.8 meq/g dry resin. When the ion exchange capacity is at least 1.35 meq/g dry resin, the polymer (H) has high proton conductivity and accordingly when it is used as an electrolyte material of a catalyst layer of a polymer electrolyte fuel cell, sufficient cell output will be obtained. When the ion exchange capacity is at most 3.8 meq/g dry resin, preparation of a polymer (F) having a high TQ will be easy, and further the increase in the water content of the polymer (H) can be suppressed.

In order that the polymer (H) may have an ion exchange capacity of at least 1.35 meq/g dry resin, the proportion of the compound (m1) when the polymer (F) is prepared is adjusted. Specifically, it is important to control the monomer composition at the time of the polymerization, and for that purpose, it is necessary to determine the charge composition considering the polymerizabilities of monomers. Further, when two or more types of monomers are reacted, it is possible to let the reaction proceed at a constant composition by successively or continuously adding a monomer having a higher reactivity.

TQ:

TQ of the polymer (F) is at least 200° C., preferably at least 230° C., more preferably at least 250° C. When TQ is at least 200° C., the increase in the water content of the polymer (H) can be suppressed even when the ion exchange capacity of the polymer (F) is increased, and accordingly when the polymer (H) is used as an electrolyte material of a catalyst layer of a polymer electrolyte fuel cell, flooding in the catalyst layer can be suppressed.

TQ of the polymer (F) is an index for the molecular weight of the polymer (F) and is a temperature at which the melt volume rate becomes 100 mm³/sec, when the polymer (F) is subjected to melt-extrusion under an extrusion pressure condition of 2.94 MPa from a nozzle having a length of 1 mm and an inner diameter of 1 mm.

A method of adjusting TQ of the polymer (F) to at least 200° C. is not particularly limited, and may, for example, be a method (i) of adjusting the polymerization conditions, or a method (ii) of adding a perfluoromonomer having two or more polymerizable carbon-carbon double bonds.

In the method (i), it is important to suppress the chain transfer at the time of the polymerization. Specifically, it is preferred to employ, as the polymerization method, bulk polymerization employing no solvent. In a case of carrying out solution polymerization, it is effective to use a solvent with small chain transfer properties. It is preferred to use, as a radical initiator, a radical initiator with small chain transfer properties, particularly a radical initiator comprising a perfluoro compound. Further, in order to reduce termination by coupling by the radical initiator, it is also effective to reduce the amount of the radical initiator relative to the monomers.

In the method (ii), as described above, TQ can be increased by adding a perfluoromonomer having two or more polymerizable carbon-carbon double bonds.

Production of Polymer (F):

The polymer (F) is produced by polymerizing the monomer (a) and the monomer (b) and as the case requires, the monomer (c).

As the polymerization method, a known polymerization method may be mentioned such as a bulk polymerization method, a solution polymerization method, a suspension polymerization method or an emulsion polymerization method. Otherwise, polymerization may be carried out in liquid or supercritical carbon dioxide.

The polymerization is carried out under a condition to form radicals. The method to form radicals may, for example, be a method of applying a radiation such as ultraviolet rays, γ-rays or electron beams, or a method of adding a radical initiator.

The polymerization temperature is usually from 10 to 150° C.

The radical initiator may, for example, be a bis(fluoroacyl) peroxide, a bis(chlorofluoroacyl) peroxide, a dialkyl peroxy dicarbonate, a diacyl peroxide, a peroxy ester, an azo compound or a persulfate, and a perfluoro compound such as a bis(fluoroacyl) peroxide is preferred from such a viewpoint that the polymer (F) substantially free from unstable terminal groups is thereby obtainable.

A solvent to be used for the solution polymerization method is preferably a solvent having a boiling point of from 20 to 350° C., more preferably a solvent having a boiling point of from 40 to 150° C. Such a solvent may, for example, be a perfluorotrialkylamine (such as perfluorotributylamine), a perfluorocarbon (such as perfluorohexane or perfluorooctane), a hydrofluorocarbon (such as 1H,4H-perfluorobutane or 1H-perfluorohexane), or a hydrochlorofluorocarbon (such as 3,3-dichloro-1,1,1,2,2-pentafluoropropane or 1,3-dichloro-1,1,2,2,3-pentafluoropropane).

In the solution polymerization method, monomers, a radical initiator, etc. are added to a solvent, and radicals are formed in the solvent to carry out polymerization of the monomers. The addition of the monomers may be all at once, sequentially or continuously.

In the suspension polymerization method, water is used as a dispersion medium, and in the dispersion medium, monomers, a non-ionic radical initiator, etc. are added to let radicals form in the dispersion medium thereby to carry out polymerization of the monomers.

The non-ionic radical initiator may, for example, be a bis(fluoroacyl) peroxide, a bis(chlorofluoroacyl) peroxide, a dialkylperoxy dicarbonate, a diacyl peroxide, a peroxy ester, a dialkyl peroxide, a bis(fluoroalkyl) peroxide or an azo compound.

To the dispersion medium, the above-mentioned solvent; a surfactant as a dispersion stabilizer to prevent agglomeration of suspended particles; a hydrocarbon compound (such as hexane or methanol) as a molecular-weight controlling agent, etc., may be added as assisting agents.

(Polymer (H))

The polymer (H) is a polymer having ion exchange groups converted from precursor groups in the polymer (F), and is a polymer having specific repeating units (A') and specific repeating units (B) and as the case requires, other repeating units (C).

Repeating Units (A')

Repeating units (A') are repeating units having ion exchange groups converted from the precursor groups in the repeating units (A).

The ion exchange group is preferably a group (g1).

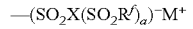
$$—(SO_2X(SO_2R^f)_a)^-M^+ \quad (g1)$$

$M^+$ is $H^+$, a monovalent metal cation or an ammonium ion in which at least one hydrogen atom may be substituted by a hydrocarbon group, and is preferably $H^+$ from the viewpoint of high proton conductivity.

$R^f$ is a linear or branched perfluoroalkyl group which may have an etheric oxygen atom. The number of carbon atoms in the perfluoroalkyl group is preferably from 1 to 8, more preferably from 1 to 6. In a case where there are two or more $R^f$'s, the respective $R^f$'s may be the same groups or different groups.

X is an oxygen atom, a nitrogen atom or a carbon atom, provided that when X is an oxygen atom, a=0, when X is a nitrogen atom, a=1, and when X is a carbon atom, a=2.

The group (g1) may, for example, be a sulfonic acid group ($—SO_3^-M^+$ group), a sulfonimide group ($—SO_2N(SO_2R^f)^-M^+$ group) or a sulfonmethide group ($—SO_2C(SO_2R^f)_2^-M^+$ group).

The repeating units (A') are preferably units (u1) in view of high polymerizability of the monomer (a) constituting the repeating units (A).

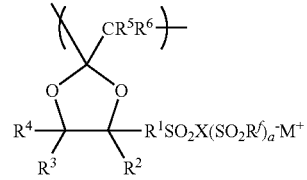

(u1)

$R^1$ to $R^6$ are as defined for the compound (m1).

It is preferred that at least one of $R^5$ and $R^6$ is a fluorine atom, and it is more preferred that both of them are a fluorine atom, in view of high polymerizability.

The units (u1) are particularly preferably units (u1-1) in view of easiness of preparation of the monomer (a) constituting the repeating units (A).

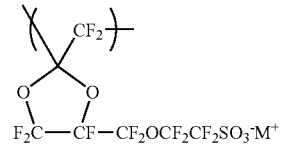

(u1-1)

Repeating Units (B):

Repeating units (B) are repeating units based on a perfluoromonomer having no ion exchange group nor its precursor group and having a dioxolane ring.

The repeating units (B) are preferably units (u2) in view of high polymerizability of the monomer (b).

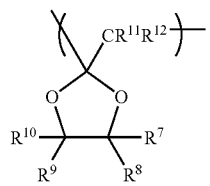

(u2)

$R^7$ to $R^{12}$ are as defined for the compound (m2).

It is preferred that at least one of $R^{11}$ and $R^{12}$ is a fluorine atom, and it is more preferred that both of them are a fluorine atom in view of high polymerizability.

The units (u2) are particularly preferably units (u2-1) in view of easiness of preparation of the monomer (b).

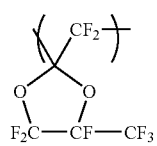

(u2-1)

Other Repeating Units (C):

Other repeating units (C) are repeating units based on a monomer other than the above perfluoromonomer having a dioxolane ring.

Such other monomer may, for example, the above-described other monomer.

Production of polymer (H):

The polymer (H) is produced by converting the precursor groups in the polymer (F) to ion exchange groups.

As a method of converting —$SO_2F$ groups to sulfonic acid groups (—$SO_3^-H^+$ groups), the following method (i) may be mentioned, and as a method of converting —$SO_2F$ groups to sulfonimide groups (—$SO_2N(SO_2R^f)^-H^+$ groups), the following method (ii) may be mentioned.

(i) A method of hydrolyzing —$SO_2F$ groups in the polymer (F) to a sulfonic acid salt and then converting the sulfonic acid salt to acid-form to obtain sulfonic acid groups.

(ii) A method of imidizing —$SO_2F$ groups in the polymer (F) to salt-form sulfonimide groups, followed by conversion to acid-form to form acid-form sulfonimide groups.

Method (i):

The hydrolysis is carried out, for example, by contacting the polymer (F) with a basic compound in a solvent. The basic compound may, for example, be sodium hydroxide or potassium hydroxide. The solvent may, for example, be water or a mixed solvent of water with a polar solvent. The polar solvent may, for example, be an alcohol (such as methanol or ethanol) or dimethylsulfoxide.

The conversion to acid-form may be carried out, for example, by contacting the polymer having a sulfonic acid salt with an aqueous solution of hydrochloric acid, sulfuric acid or the like.

The hydrolysis and conversion to acid-form are carried out usually at a temperature of from 0 to 120° C.

Method (ii):

As the imidation, the following methods may, for example, be mentioned.

(ii-1) A method of reacting —$SO_2F$ groups with $R^f SO_2NHM$.

(ii-2) A method of reacting —$SO_2F$ groups with $R^f SO_2NH_2$ in the presence of an alkali metal hydroxide, an alkali metal carbonate, MF, ammonia or a primary to tertiary amine.

(ii-3) A method of reacting —$SO_2F$ groups with $R^f SO_2NMSi(CH_3)_3$.

Here, M is an alkali metal or a primary to quaternary ammonium.

The conversion to acid-form is carried out by treating the polymer having salt-form sulfonimide groups with an acid (such as sulfuric acid, nitric acid or hydrochloric acid).

Further, the polymer (H) wherein ion exchange groups are sulfonimide groups may also be produced by polymerizing a compound (m1') having a sulfonimide group converted from a —$SO_2F$ group in the compound (m1), and the compound (m2), and as the case requires, other monomers.

The compound (m1') may be produced by adding chlorine or bromine to the carbon-carbon double bond in the compound (m1), and converting a —$SO_2F$ group to a sulfonimide group by the method (ii), followed by a dechlorination or debromination reaction by means of metallic zinc.

The above-described electrolyte material of the present invention comprises a polymer (H) which has ion exchange groups converted from precursor groups in a polymer (F) having specific repeating units (A) and specific repeating units (B), and which has an ion exchange capacity of at least 1.35 meq/g dry resin, and accordingly a membrane/electrode assembly having a catalyst layer containing the electrolyte material can exhibit sufficient power generation characteristics (such as output voltage) under low or no humidity conditions.

Here, the water content (water absorptivity) of the polymer (H) will be drastically increased merely by increasing the ion exchange capacity of the polymer (H). Accordingly, the present inventors have conducted extensive studies and as a result, they have found that the increase in the water content of the polymer (H) can be suppressed by increasing TQ of the polymer (F) in addition to increasing the ion exchange capacity of the polymer (F).

It has been known that with respect to a conventional crystalline polymer (e.g. a polymer having sulfonic acid groups converted from —$SO_2F$ groups in a polymer having repeating units based on the above compound (m3) and repeating units based on TFE), the mechanical strength is increased when the molecular weight (i.e. TQ) is increased, however, the effect of suppressing the water content is small even when TQ is increased. The phenomenon such that the increase in the water content can be suppressed when TQ is increased, is remarkable particularly in an amorphous polymer such as the polymer (H) of the present invention.

<Liquid Composition>

The liquid composition of the present invention is a composition comprising a dispersion medium and the electrolyte material of the present invention dispersed in the dispersion medium.

The dispersion medium contains an organic solvent having a hydroxy group.

The organic solvent having a hydroxy group may, for example, be methanol, ethanol, 1-propanol, 2-propanol, 2,2,2-trifluoroethanol, 2,2,3,3,3-pentafluoro-1-propanol, 2,2,3,3,-tetrafluoro-1-propanol, 4,4,5,5,5-pentafluoro-1-pentanol, 1,1,1,3,3,3-hexafluoro-2-propanol, 3,3,3-trifluoro- 1-propanol, 3,3,4,4,5,5,6,6,6-nonafluoro-1-hexanol, 3,3,4,4, 5,5,6,6,7,7,8,8,8-tridecafluoro-1-octanol.

The organic solvents having a hydroxy group may be used alone or as a mixture of two or more of them.

The dispersion medium preferably contains water.

The proportion of water is preferably from 10 to 99 mass %, more preferably from 40 to 99 mass % in the dispersion medium (100 mass %). Dispersibility of the electrolyte material in the dispersion medium can be improved by increasing the proportion of water.

The proportion of the organic solvent having a hydroxy group is preferably from 1 to 90 mass %, more preferably from 1 to 60 mass % in the dispersion medium (100 mass %).

The proportion of the electrolyte material is preferably from 1 to 50 mass %, more preferably from 3 to 30 mass % in the liquid composition (100 mass %).

The liquid composition of the present invention is suitably used for formation of a catalyst layer of a membrane/electrode assembly as described hereinafter.

<Membrane/Electrode Assembly>

FIG. 1 is a cross section illustrating one example of a membrane/electrode assembly (hereinafter referred to as a membrane/electrode assembly) for a polymer electrolyte fuel cell of the present invention. A membrane/electrode assembly 10 comprises an anode 13 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in a state where it is in contact with the catalyst layers 11.

(Catalyst Layer)

The catalyst layer 11 is a layer containing a catalyst and a proton conductive polymer.

The catalyst may be a supported catalyst having platinum or a platinum alloy supported on a carbon carrier.

The carbon carrier may, for example, be a carbon black powder.

The proton conductive polymer may be the electrolyte material of the present invention or a known electrolyte material. The proton conductive polymer contained in the catalyst layer of at least one of the cathode and the anode is the electrolyte material of the present invention, and it is preferred that the proton conductive polymer contained in the catalyst layer of both the cathode and the anode is the electrolyte material of the present invention.

The catalyst layer 11 may contain a water-repellent agent with a view to increasing the effect to suppress flooding. The water-repellent agent may, for example, be a tetrafluoroethylene/hexafluoropropylene copolymer, a tetrafluoroethylene/perfluoro(alkyl vinyl ether) copolymer or polytetrafluoroethylene. The water-repellent agent is preferably a fluoropolymer soluble in a solvent, from such a viewpoint that the water repellent treatment of the catalyst layer 11 is easy. The amount of the water-repellent agent is preferably from 0.01 to 30 mass % in the catalyst layer (100 mass %).

As a method of forming the catalyst layer 11, the following methods may be mentioned.

(i) A method of applying a fluid for forming a catalyst layer on the polymer electrolyte membrane 15, the gas diffusion layer 12 or a carbon layer 16, followed by drying.

(ii) A method of applying a fluid for forming a catalyst layer on a substrate film, followed by drying to form a catalyst layer 11, and transferring the catalyst layer 11 to the polymer electrolyte membrane 15.

The fluid for forming a catalyst layer is a fluid comprising the electrolyte material and the catalyst dispersed in a dispersion medium. The fluid for forming a catalyst layer may be prepared, for example, by mixing the liquid composition of the present invention with a dispersion of the catalyst.

(Gas Diffusion Layer)

The gas diffusion layer 12 has a function to uniformly diffuse a gas into the catalyst layer 11 and a function as a current collector.

The gas diffusion layer 12 may, for example, be carbon paper, carbon cloth or carbon felt.

The gas diffusion layer 12 is preferably subjected to water repellent treatment e.g. by polytetrafluoroethylene.

(Carbon Layer)

Figure 2:
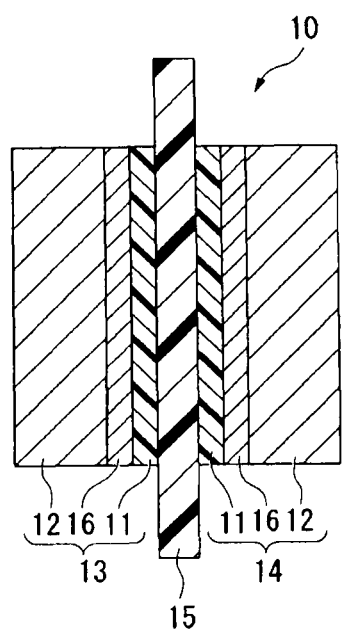
FIG. 2 is a cross section illustrating another example of a membrane/electrode assembly of the present invention.

The membrane/electrode assembly 10 may have a carbon layer 16 between the catalyst layer 11 and the gas diffusion layer 12 as shown in FIG. 2. By disposing the carbon layer 16, the gas diffusion properties on the surface of the catalyst layer 11 will be improved, and the power generation performance of a polymer electrolyte fuel cell will be remarkably improved.

The carbon layer 16 is a layer containing carbon and a nonionic fluoropolymer.

The carbon is preferably carbon nanofibers having a fiber diameter of from 1 to 1,000 nm and a carbon length of at most 1,000 μm.

The nonionic fluoropolymer may, for example, be polytetrafluoroethylene.

(Polymer Electrolyte Membrane)

The polymer electrolyte membrane 15 is a membrane containing a proton conductive polymer.

The proton conductive polymer may be the electrolyte material of the present invention or a known electrolyte material. The known electrolyte material may, for example, be a polymer having sulfonic acid groups converted from —SO$_2$F groups in a polymer having repeating units based on the above-described compound (m3) and repeating units based on TFE; or a polymer having sulfonic acid groups converted from —SO$_2$F groups in a polymer having repeating units based on a compound (m4) and repeating units based on TFE.

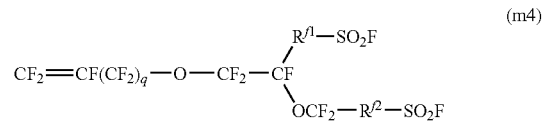

(m4)

wherein each of $R^{f1}$ and $R^{f2}$ is a single bond or a $C_{1-6}$ linear perfluoroalkylene group (which may have an etheric oxygen atom), and q is 0 or 1.

The polymer electrolyte membrane 15 can be formed, for example, by a method (a casting method) wherein a liquid composition of the electrolyte material is applied on a substrate film or the catalyst layer 11, followed by drying.

The liquid composition is a dispersion having the electrolyte material dispersed in a dispersion medium containing an organic solvent having a hydroxy group and water.

In order to stabilize the polymer electrolyte membrane 15, it is preferred to carry out heat treatment. The temperature for the heat treatment is preferably from 130 to 200° C. depending on the type of the electrolyte material. When the temperature for the heat treatment is at least 130° C., the electrolyte material will not excessively contain water. When the temperature for the heat treatment is at most 200° C., heat decomposition of ion exchange groups may be suppressed, and a decrease in the proton conductivity of the polymer electrolyte membrane 15 may be suppressed.

The polymer electrolyte membrane 15 may be treated with an aqueous hydrogen peroxide solution as the case requires.

The polymer electrolyte membrane 15 may be reinforced by a reinforcing material. The reinforcing material may, for example, be a porous body, fibers, woven fabric or nonwoven fabric. The material of the reinforcing material may, for example, be polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide.

The polymer electrolyte membrane 15 may contain at least one type of atoms selected from the group consisting of cerium and manganese in order to further improve the durability. Cerium and manganese will decompose hydrogen peroxide which is a substance to cause deterioration of the polymer electrolyte membrane 15. Such cerium or manganese is preferably present in the form of ions in the polymer electrolyte membrane 15, and if it is present in the form of ions, it may be present in any state in the polymer electrolyte membrane 15.

The polymer electrolyte membrane 15 may contain silica or a hetero polyacid (such as zirconium phosphate, phosphorus molybdic acid or phosphorus tungstic acid) as a water retention agent to prevent drying.

(Process for Producing Membrane/Electrode Assembly)

The membrane/electrode assembly 10 is produced, for example, by the following method.

(i) A method of forming catalyst layers 11 on a polymer electrolyte membrane 15 to form a membrane/catalyst layer assembly, and sandwiching such a membrane/catalyst layer assembly between gas diffusion layers 12.

(ii) A method of forming a catalyst layer 11 on a gas diffusion layer 12 to form electrodes (anode 13 and cathode 14), and sandwiching a polymer electrolyte membrane 15 between such electrodes.

In a case where the membrane/electrode assembly 10 has a carbon layer 16, the membrane/electrode assembly 10 is produced, for example, by the following method.

(i) A method of applying a dispersion containing carbon and a nonionic fluoropolymer on a substrate film, followed by drying to form a carbon layer 16, forming a catalyst layer 11 on the carbon layer 16, bonding such catalyst layers 11 to a polymer electrolyte membrane 15, separating the substrate films to form a membrane/catalyst layer assembly having the carbon layers 16, and sandwiching such a membrane/catalyst layer assembly between gas diffusion layers 12.

(ii) A method of applying a dispersion containing carbon and a nonionic fluoropolymer on a gas diffusion layer 12, followed by drying to form a carbon layer 16, and sandwiching a membrane/catalyst layer assembly having catalyst layers 11 formed on a polymer electrolyte membrane 15 between the gas diffusion layers 12 each having the carbon layer 16.

The above-described membrane/electrode assembly 10 is excellent in the power generation characteristics under low or no humidity conditions and under high humidity conditions since the catalyst layer 11 contains the electrolyte material of the present invention.

<Polymer Electrolyte Fuel Cell>

The membrane/electrode assembly of the present invention is used for a polymer electrolyte fuel cell. A polymer electrolyte fuel cell is produced, for example, by sandwiching a membrane/electrode assembly between two separators to form a cell, and stacking a plurality of such cells.

As a separator, an electrically conductive carbon plate having grooves formed to constitute flow paths for a fuel gas or an oxidant gas containing oxygen (such as air or oxygen) may, for example, be mentioned.

As a type of the polymer electrolyte fuel cell, a hydrogen/oxygen type fuel cell or a direct methanol type fuel cell (DMFC) may, for example, be mentioned. Methanol or a methanol aqueous solution to be used as a fuel for DMFC may be a liquid feed or a gas feed.

EXAMPLES

Now, the present invention will be described in detail with reference to Examples. However, it should be understood that the present invention is by no means restricted to such specific Examples.

Examples 1 to 9 and 17 to 25 are Examples of the present invention, and Examples 10 to 16 and 26 to 32 are Comparative Examples.

(Ion Exchange Capacity)

Using a 0.35 N sodium hydroxide solution, the polymer (F) was hydrolyzed at 80° C. over a period of 72 hours, and unreacted sodium hydroxide was titrated with 0.1 N hydrochloric acid to obtain the ion exchange capacity of the polymer (H).

(TQ)

TQ is an index for the molecular weight of the polymer (F) and is a temperature at which the melt volume rate becomes 100 $mm^3$/sec, when the polymer (F) is subjected to melt-extrusion under an extrusion pressure condition of 2.94 MPa from a nozzle having a length of 1 mm and an inner diameter of 1 mm.

Using Flow Tester CFT-500A (manufactured by Shimadzu Corporation), the melt volume rate of the polymer (F) was measured by changing the temperature, whereby the temperature (TQ) at which the melt volume rate became 100 $mm^3$/sec was obtained.

(Water Content)

The water content of the polymer (H) was obtained by the following method.

The polymer (F) was subjected to press molding at the temperature TQ to obtain a film having a thickness of from 100 to 200 μm. Then, the film was immersed in an aqueous solution containing 20 mass % of methanol and 15 mass % of potassium hydroxide for 40 hours to hydrolyze and convert —$SO_2F$ groups in the polymer (F) in the film to —$SO_3K$ groups. Then, the film was immersed in a 3 mol/L hydrochloric acid aqueous solution for 2 hours. The hydrochloric acid aqueous solution was changed, and the same treatment was further carried out four times. The film was sufficiently washed with ultrapure water to convert the —$SO_3K$ groups in the polymer in the film to sulfonic acid groups thereby to obtain a film of the polymer (H).

The film was further immersed in warm water at 80° C. for 16 hours, and the film together with warm water was cooled to room temperature. The film was taken out from water, water droplets attached to the surface were wiped off, and the mass of the film containing water was immediately measured. Then, the film was put in a glove box and left to stand in an atmosphere into which dry nitrogen was blown for 24 hours or longer to dry the film. Then, the dry mass of the film was measured in the glove box. The mass of water which the polymer (H) absorbs when it contains water was obtained from the difference between the mass of the film when it contained water and the dry mass. Further, the water content of the polymer was obtained from the following formula.

Water content=(mass of water which the polymer (H) absorbs when it contains water/dry mass of the film)×100

(Compound (m1))

Preparation of Compound (m1-1):

Compound (m1-1) was prepared in accordance with the method disclosed in Examples at pages 37 to 42 of WO2003/037885.

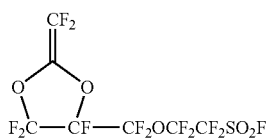
(m1-1)

Preparation of Compound (m1-2):

Compound (m1-2) was prepared in accordance with the method disclosed in Example 5 of JP-A-2005-314388.

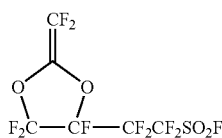
(m1-2)

Preparation of Compound (m1-3):

Compound (m1-3) was prepared in accordance with the method disclosed in Example 4 of JP-A-2005-314388.

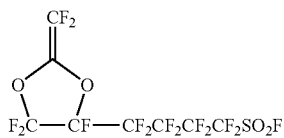
(m1-3)

Preparation of Compound (m1-4):

Compound (m1-4) was prepared in accordance with the method disclosed in Example 1-6 of JP-A-2009-040909.

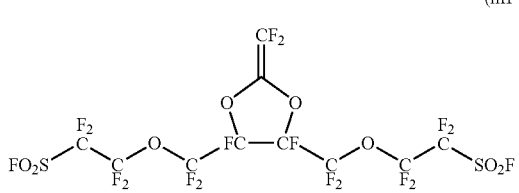
(m1-4)

(Compound (m2))

Compound (m2-1):

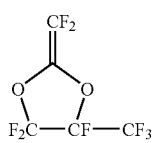
(m2-1)

Compound (m2-2):

(m2-2)

(Other Monomer)

Compound (m3-1):

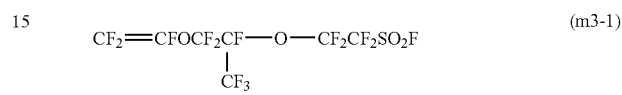
(m3-1)

Preparation of Compound (m4-1):

Compound (m4-1) was prepared in accordance with the method disclosed in Example 1 of JP-A-2008-202039.

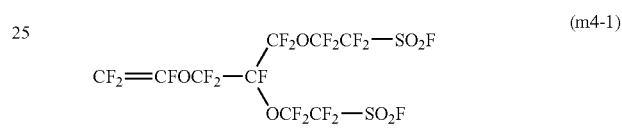
(m4-1)

Compound (m5-2-1):

$$CF_2=CFO(CF_2)_4OCF=CF_2 \quad (m5\text{-}2\text{-}1)$$

(Radial Initiator)

Compound (i-1):

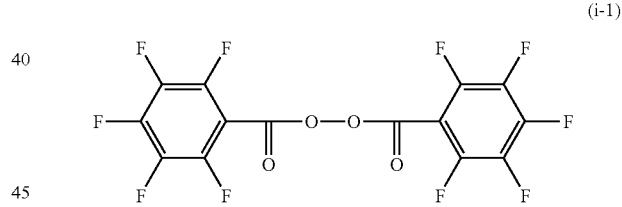
(i-1)

Compound (i-2):

$$(C_3F_7COO)_2 \quad (i\text{-}2)$$

Compound (i-3):

$$(CH_3)_2(CN)C-N=N-C(CN)(CH_3)_2 \quad (i\text{-}3)$$

(Solvent)

Compound (s-1):

$$CClF_2CF_2CHClF \quad (s\text{-}1)$$

Compound (s-2):

$$CH_3CCl_2F \quad (s\text{-}2)$$

Example 1

Into a stainless steel autoclave having an internal capacity of 125 mL, 9.16 g of compound (m1-1), 5.67 g of compound (m2-1), 5.0 g of compound (s-1) and 2.4 mg of compound (i-1) were charged, followed by sufficient deaeration under cooling with liquid nitrogen. Then, the temperature was raised to 65° C., followed by stirring for 23.5 hours, and then the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-1). The yield was 6.35 g. Using polymer (F-1), TQ of polymer (F-1) and the ion exchange capacity and the water content of polymer (H-1) were measured. The results are shown in Table 1.

Polymer (F-1) was immersed in an aqueous solution containing 20 mass % of methanol and 15 mass % of potassium hydroxide for 40 hours to hydrolyze and convert —$SO_2F$ groups in polymer (F-1) to —$SO_3K$ groups. Then, the polymer was immersed in a 3 mol/L hydrochloric acid aqueous solution for 2 hours. The hydrochloric acid aqueous solution was changed, and the same treatment was further carried out four times. The polymer was sufficiently washed with ultrapure water to obtain polymer (H-1) having sulfonic acid groups converted from —$SO_3K$ groups in the polymer.

To polymer (H-1), a mixed solvent of ethanol and water (ethanol/water=70/30 mass ratio) was added to adjust the solid content concentration to 15 mass %, followed by stirring using an autoclave at 125° C. for 8 hours. Water was further added to adjust the solid content concentration to 7.0 mass % to obtain liquid composition (D-1) having polymer (H-1) dispersed in a dispersion medium. The composition of the dispersion medium was ethanol/water=35/65 (mass ratio).

Example 2

Into a stainless steel autoclave having an internal capacity of 125 mL, 9.26 g of compound (m1-1), 5.03 g of compound (m2-1), 17.5 g of compound (s-1) and 28.3 mg of compound (i-1), were charged, followed by sufficient deaeration under cooling with liquid nitrogen. Then, the temperature was raised to 65° C., followed by stirring for 8 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-2). The yield was 9.8 g. Using polymer (F-2), TQ of polymer (F-2) and the ion exchange capacity and the water content of polymer (H-2) were measured. The results are shown in Table 1.

Using polymer (F-2), polymer (H-2) and liquid composition (D-2) were obtained in the same manner as in Example 1.

Example 3

Into a stainless steel autoclave having an internal capacity of 125 mL, 8.95 g of compound (m1-1), 5.73 g of compound (m2-1), 7.1 g of compound (s-1), and 265 mg of a compound (s-1) solution containing 3.2 mass % of compound (i-2), were charged, followed by sufficient deaeration under cooling with liquid nitrogen. Then, the temperature was raised to 21° C., followed by stirring for 16.3 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-3). The yield was 12.4 g. Using polymer (F-3), TQ of polymer (F-3) and the ion exchange capacity and the water content of polymer (H-3) were measured. The results are shown in Table 1.

Using polymer (F-3), polymer (H-3) and liquid composition (D-3) were obtained in the same manner as in Example 1.

Example 4

Into a stainless steel autoclave having an internal capacity of 125 mL, 10.5 g of compound (m1-1), 2.0 g of compound (m2-1), 0.85 g of compound (m5-2-1), and 380 mg of a compound (s-1) solution containing 3.2 mass % of compound (i-2), are charged, followed by sufficient deaeration under cooling with liquid nitrogen. Then, the temperature is raised to 21° C., followed by stirring for 17 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-4). The yield is 5.4 g. Using polymer (F-4), TQ of polymer (F-4) and the ion exchange capacity and the water content of polymer (H-4) are measured. The results are shown in Table 1.

Using polymer (F-4), polymer (H-4) and liquid composition (D-4) are obtained in the same manner as in Example 1.

Example 5

Into a stainless steel autoclave having an internal capacity of 125 mL, 10.6 g of compound (m1-3), 6.0 g of compound (m2-1), 5.4 g of compound (s-1) and 2.7 mg of compound (i-1), are charged, followed by sufficient deaeration under cooling with liquid nitrogen. Then, the temperature is raised to 65° C., followed by stirring for 20 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-5). The yield is 8.0 g. Using polymer (F-5), TQ of polymer (F-5) and the ion exchange capacity and the water content of polymer (H-5) are measured. The results are shown in Table 1.

Using polymer (F-5), polymer (H-5) and liquid composition (D-5) are obtained in the same manner as in Example 1.

Example 6

Into a stainless steel autoclave having an internal capacity of 125 mL, 7.0 g of compound (m1-2), 5.1 g of compound (m2-1), 4.5 g of compound (s-1), and 4.5 mg of compound (i-1), are charged, followed by sufficient deaeration under cooling with liquid nitrogen. Then, the temperature is raised to 65° C., followed by stirring for 16 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-6). The yield is 6.8 g. Using polymer (F-6), TQ of polymer (F-6) and the ion exchange capacity and the water content of polymer (H-6) are measured. The results are shown in Table 1.

Using polymer (F-6), polymer (H-6) and liquid composition (D-6) are obtained in the same manner as in Example 1.

Example 7

Into a stainless steel autoclave having an internal capacity of 125 mL, 7.2 g of compound (m1-4), 5.5 g of compound (m2-1) and 2.0 mg of compound (i-1), are charged, followed by sufficient deaeration under cooling with liquid nitrogen. Then, the temperature is raised to 65° C., followed by stirring for 18 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-7). The yield is 7.0 g. Using polymer (F-7), TQ of polymer (F-7) and the ion exchange capacity and the water content of polymer (H-7) are measured. The results are shown in Table 1.

Using polymer (F-7), polymer (H-7) and liquid composition (D-7) are obtained in the same manner as in Example 1.

Example 8

Into a stainless steel autoclave having an internal capacity of 31 mL, 7.2 g of compound (m1-1), 3.9 g of compound (m2-1), 12.5 g of compound (s-1), 2.0 g of TFE and 5.9 mg of compound (i-1), were charged, followed by sufficient deaeration under cooling with liquid nitrogen. Then, the temperature was raised to 65° C., followed by stirring for 6 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-8). The yield was 6.1 g. Using polymer (F-8), TQ of polymer (F-8) and the ion exchange capacity and the water content of polymer (H-8) were measured. The results are shown in Table 1.

Using polymer (F-8), polymer (H-8) and liquid composition (D-8) were obtained in the same manner as in Example 1.

Example 9

Into a stainless steel autoclave having an internal capacity of 125 mL, 9.15 g of compound (m1-1), 8.60 g of compound (m2-2) and 9.0 mg of compound (i-1), are charged, followed by sufficient deaeration under cooling with liquid nitrogen. Then, the temperature is raised to 65° C. and held for 15 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-9). The yield is 8.8 g. Using polymer (F-9), TQ of polymer (F-9) and the ion exchange capacity and the water content of polymer (H-9) are measured. The results are shown in Table 1.

Using polymer (F-9), polymer (H-9) and liquid composition (D-9) are obtained in the same manner as in Example 1.

Example 10

Into a stainless steel autoclave having an internal capacity of 230 mL, 123.8 g of compound (m3-1), 63.6 g of compound (s-1) and 63.6 mg of compound (i-3) were charged, followed by sufficient deaeration under cooling with liquid nitrogen. Then, the temperature was raised to 70° C., TFE was introduced to the system to maintain the pressure under 1.14 MPaG. After stirring for 8 hours, the autoclave was cooled to terminate the reaction.

The formed product was diluted with compound (s-1), and compound (s-2) was added thereto to agglomerate a polymer, followed by filtration. Then, the polymer was stirred in compound (s-1), re-agglomerated with compound (s-2) and dried under reduced pressure overnight at 80° C. to obtain polymer (F-10). The yield was 25.2 g. Using polymer (F-10), TQ of polymer (F-10) and the ion exchange capacity and the water content of polymer (H-10) were measured. The results are shown in Table 1.

Using polymer (F-10), polymer (H-10) and liquid composition (D-10) were obtained in the same manner as in Example 1.

Example 11

Into a stainless steel autoclave having an internal capacity of 230 mL, 140.0 g of compound (m4-1), 30.2 g of compound (s-1) and 170 mg of compound (i-3) are charged, followed by sufficient deaeration under cooling with liquid nitrogen. Then, the temperature is raised to 65° C., TFE is introduced to the system to maintain the pressure under 1.23 MPaG. After stirring at 65° C. for 7.2 hours, the gas in the system is purged, and the autoclave is cooled to terminate the reaction.

The formed product is diluted with compound (s-1), and compound (s-2) is added thereto to agglomerate a polymer, followed by filtration. Then, the polymer is stirred in compound (s-1), re-agglomerated with compound (s-2) and dried under reduced pressure overnight at 80° C. to obtain polymer (F-11). The yield is 27.2 g. Using polymer (F-11), TQ of polymer (F-11) and the ion exchange capacity and the water content of polymer (H-11) are measured. The results are shown in Table 1.

Using polymer (F-11), polymer (H-11) is obtained in the same manner as in Example 1.

To polymer (H-11), a mixed solvent of ethanol, water and 1-butanol (ethanol/water/1-butanol=35/50/15 mass ratio) is added to adjust the solid content concentration to 15 mass %, followed by stirring using an autoclave at 125° C. for 8 hours. Water is further added to adjust the solid content concentration to 9 mass % thereby to obtain liquid composition (D-11) having polymer (H-11) dispersed in a dispersion medium. The composition of the dispersion medium is ethanol/water/1-butanol=20/70/10 (mass ratio).

Example 12

Into a stainless steel autoclave having an internal capacity of 125 mL, 9.38 g of compound (m1-1), 11.36 g of compound (m2-1), 28.59 g of compound (s-1) and 80.2 mg of compound (i-1) were charged, followed by sufficient deaeration under cooling with liquid nitrogen. Then, the temperature was raised to 65° C., followed by stirring for 5.6 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-12). The yield was 14.0 g. Using polymer (F-12), TQ of polymer (F-12) and the ion exchange capacity and the water content of polymer (H-12) were measured. The results are shown in Table 1.

Using polymer (F-12), polymer (H-12) and liquid composition (D-12) were obtained in the same manner as in Example 1.

Example 13

Into a stainless steel autoclave having an internal capacity of 125 mL, 9.99 g of compound (m1-1), 11.44 g of compound (m2-1), 28.58 g of compound (s-1) and 100 mg of compound (i-1) were charged, followed by sufficient deaeration under cooling with liquid nitrogen. Then, the temperature was raised to 65° C., followed by stirring for 3.5 hours, and the autoclave was cooled to terminate the reaction.

The formed product was diluted with compound (s-1), and n-hexane was added thereto to agglomerate a polymer, followed by filtration. Then, the polymer was stirred in compound (s-1), re-agglomerated with n-hexane and dried under reduced pressure overnight at 80° C. to obtain polymer (F-13). The yield was 14.2 g. Using polymer (F-13), TQ of polymer (F-13) and the ion exchange capacity and the water content of polymer (H-13) were measured. The results are shown in Table 1.

Using polymer (F-13), polymer (H-13) and liquid composition (D-13) were obtained in the same manner as in Example 1.

Example 14

Into a stainless steel autoclave having an internal capacity of 125 mL, 4.5 g of compound (m2-1), 80.0 g of compound (m3-1) and 30.0 mg of a compound (s-1) solution containing 3.2 mass % of compound (i-2) are charged, followed by sufficient deaeration under cooling with liquid nitrogen. Then, the temperature is raised to 21° C., followed by stirring for 15 hours and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-14). The yield is 4.5 g. Using polymer (F-14), TQ of polymer (F-14) and the ion exchange capacity and the water content of polymer (H-14) are measured. The results are shown in Table 1.

Using polymer (F-14), polymer (H-14) and liquid composition (D-14) are obtained in the same manner as in Example 1.

Example 15

Into a stainless steel autoclave having an internal capacity of 125 mL, 0.9 g of compound (m1-1), 93.66 g of compound (m4-1), 15.4 g of TFE, and 5.0 mg of a compound (s-1) solution containing 3.2 mass % of compound (i-2) are charged, followed by sufficient deaeration under cooling with liquid nitrogen. Then, the temperature is raised to 21° C., followed by stirring for 15 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-15). The yield is 9.7 g. Using polymer (F-15), TQ of polymer (F-15) and the ion exchange capacity and the water content of polymer (H-15) are measured. The results are shown in Table 1.

Using polymer (F-15), polymer (H-15) and liquid composition (D-15) are obtained in the same manner as in Example 1.

Example 16

Into a stainless steel autoclave having an internal capacity of 125 mL, 4.16 g of compound (m1-1), 2.26 g of compound (m2-1), 79.0 g of compound (s-1) and 255 mg of compound (i-1) are charged, followed by sufficient deaeration under cooling with liquid nitrogen. Then, the temperature is raised to 65° C., followed by stirring for 6 hours, and the autoclave is cooled to terminate the reaction.

The formed product is diluted with compound (s-1), and n-hexane is added thereto to agglomerate a polymer, followed by filtration. Then, the polymer is stirred in compound (s-1), re-agglomerated with n-hexane and dried under reduced pressure overnight at 80° C. to obtain polymer (F-16). The yield is 4.3 g. Using polymer (F-16), TQ of polymer (F-16) and the ion exchange capacity and the water content of polymer (H-16) are measured. The results are shown in Table 1.

Using polymer (F-16), polymer (H-16) and liquid composition (D-16) are obtained in the same manner as in Example 1.

TABLE 1

| Ex. | Ion exchange capacity (meq/g dry resin) | TQ (° C.) | Water content (%) |
|---|---|---|---|
| 1 | 1.54 | 262 | 420 |
| 2 | 1.49 | 262 | 307 |
| 3 | 1.38 | 270 | 180 |
| 4 | 1.95 | 350 | 285 |
| 5 | 1.58 | 258 | 435 |
| 6 | 1.62 | 268 | 510 |
| 7 | 1.65 | 265 | 253 |
| 8 | 1.48 | 245 | 100 |
| 9 | 1.45 | 265 | 235 |
| 10 | 1.10 | 220 | 45 |
| 11 | 1.51 | 230 | 73 |
| 12 | 1.13 | 257 | 49 |
| 13 | 1.25 | 250 | 73 |
| 14 | 1.45 | 230 | 315 |
| 15 | 1.43 | 232 | 89 |
| 16 | 1.45 | 150 | 653 |

Example 17

39 g of water was added to 10 g of a supported catalyst having 50 mass % of platinum supported on a carbon powder, followed by irradiation with ultrasonic waves for 10 minutes to obtain a dispersion of the catalyst. To the dispersion of the catalyst, 60 g of liquid composition (D-1) was added, and 64 g of ethanol was further added to adjust the solid content concentration to 8 mass % to obtain a fluid for forming a catalyst layer. The fluid was applied on a separately prepared sheet comprising a copolymer of ethylene and tetrafluoroethylene (tradename: Aflex 100N, manufactured by Asahi Glass Company, Limited, thickness: 100 μm) (hereinafter referred to as an ETFE sheet) and dried at 80° C. for 30 minutes and further subjected to heat treatment at 165° C. for 30 minutes to form a catalyst layer having an amount of platinum of 0.35 mg/cm².

Liquid composition (D-11) was applied on an ETFE sheet by means of a die coater, dried at 80° C. for 30 minutes and further subjected to heat treatment at 190° C. for 30 minutes to form a polymer electrolyte membrane having a thickness of 20 μm.

The ETFE sheet was separated from the polymer electrolyte membrane, the polymer electrolyte membrane was sandwiched between two catalyst layers (provided with the ETFE film) and heat pressed at a pressing temperature of 160° C. for a pressing time of 5 minutes under a pressure of 3 MPa to bond the catalyst layers on both sides of the polymer electrolyte membrane, and the ETFE films were separated from the catalyst layers to obtain a membrane/catalyst layer assembly having an electrode area of 25 cm².

On a gas diffusion layer comprising carbon paper, a carbon layer comprising carbon and polytetrafluoroethylene was formed.

The membrane/catalyst layer assembly was sandwiched between two gas diffusion layers so that the carbon layer and the catalyst layer were in contact with each other, to obtain a membrane/electrode assembly.

The membrane/electrode assembly was assembled into a cell for power generation, and the power generation characteristics were evaluated under the following two conditions.

(Power Generation Conditions 1)

While the temperature of the membrane/electrode assembly was maintained at 100° C., hydrogen (utilization ratio: 50%) was supplied to the anode and air (utilization ratio: 50%) was supplied to the cathode, under a pressure of 175 kPa (absolute pressure). Both hydrogen and air were supplied without being humidified, and the cell voltage when the current density was 1.0 A/cm² was recorded and evaluated under the following standards. The results are shown in Table 2.

⊚: Cell voltage being 0.6 V or higher.
○: Cell voltage being 0.55 V or higher and less than 0.6 V.
Δ: Cell voltage being 0.5 V or higher and less than 0.55 V.
×: Cell voltage being 0.4 V or higher and less than 0.5 V.
××: Cell voltage being less than 0.4 V.

(Power Generation Conditions 2)

While the temperature of the membrane/electrode assembly was maintained at 80° C., hydrogen (utilization ratio: 50%) was supplied to the anode and air (utilization ratio: 50%) was supplied to the cathode, under a pressure of 175 kPa (absolute pressure). Both hydrogen and air were supplied under a relative humidity of 100% RH, and the cell voltage when the current density was 1.5 A/cm² was recorded and evaluated under the following standards. The results are shown in Table 2.

○: Cell voltage being 0.5 V or higher.
Δ: Cell voltage being less than 0.5 V.
×: No power generation conducted.

Examples 18 to 32

A membrane/electrode assembly was prepared and the power generation characteristics were evaluated in the same manner as in Example 17 except that liquid composition (D-1) used for formation of the catalyst layers was changed to each of liquid compositions (D-2) to (D-16). The evaluation results are shown in Table 2.

TABLE 2

| Ex. | Dispersion | Power generation conditions 1 | Power generation conditions 2 |
|---|---|---|---|
| 17 | D-1 | ○ | Δ |
| 18 | D-2 | ○ | Δ |
| 19 | D-3 | Δ | ○ |
| 20 | D-4 | ⊚ | ○ |
| 21 | D-5 | ○ | Δ |
| 22 | D-6 | ○ | Δ |
| 23 | D-7 | ○ | ○ |
| 24 | D-8 | Δ | ○ |
| 25 | D-9 | ○ | ○ |
| 26 | D-10 | × × | ○ |
| 27 | D-11 | × | ○ |
| 28 | D-12 | × | ○ |
| 29 | D-13 | × | ○ |
| 30 | D-14 | × | Δ |
| 31 | D-15 | × | ○ |
| 32 | D-16 | Δ | × |

The electrolyte material of the present invention is useful as an electrolyte material for a polymer electrolyte fuel cell. Further, it is also useful for other applications (such as a proton permselective membrane to be used for water electrolysis, hydrogen peroxide production, ozone production or waste acid recovery; a diaphragm for electrolysis of sodium chloride or a redox flow cell, or a cation exchange membrane for electrodialysis to be used for desalination or salt production).

The entire disclosures of Japanese Patent Application No. 2009-130361 filed on May 29, 2009 and U.S. Provisional Patent Application No. 61/299,563 filed on Jan. 29, 2010 including specifications, claims, drawings and summaries are incorporated herein by reference in their entireties.

What is claimed is:

1. An electrolyte material, which comprises a polymer (H) having ion exchange groups converted from precursor groups in the following polymer (F), and having an ion exchange capacity of at least 1.35 meq/g dry resin:
polymer (F): a polymer which has repeating units (A) based on a perfluoromonomer having a precursor group of an ion exchange group and a dioxolane ring and repeating units (B) based on a perfluoromonomer having no ion exchange group nor its precursor group and having a dioxolane ring, and which has a TQ as defined below of at least 200° C.:
TQ: a temperature at which the melt volume rate becomes 100 mm³/sec, when the polymer (F) is subjected to melt extrusion under an extrusion pressure condition of 2.94 MPa from a nozzle having a length of 1 mm and an inner diameter of 1 mm.

2. The electrolyte material according to claim 1, wherein the ion exchange groups in the polymer (H) are groups represented by the following formula (g1):

wherein M⁺ is H⁺, a monovalent metal cation or an ammonium ion in which at least one hydrogen atom may be substituted by a hydrocarbon group, $R^f$ is a linear or branched perfluoroalkyl group which optionally has an etheric oxygen atom, and X is an oxygen atom, a nitrogen atom or a carbon atom, provided that when X is an oxygen atom, a=0, when X is a nitrogen atom, a=1, and when X is a carbon atom, a=2.

3. The electrolyte material according to claim 2, wherein at least one type of repeating units having ion exchange groups converted from the precursor groups in the repeating units (A) are repeating units represented by the following formula (u1):

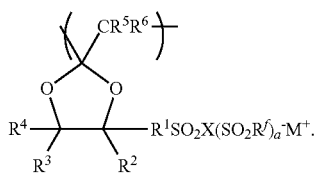

(u1)

wherein $R^1$ is a bivalent perfluoroorganic group which optionally has an etheric oxygen atom, and each of $R^2$ to $R^6$ which are independent of one another, is a monovalent perfluoroorganic group which optionally has an etheric oxygen atom, or a fluorine atom.

4. The electrolyte material according to claim 3, wherein $R^5$ and $R^6$ are a fluorine atom.

5. The electrolyte material according to any one of claims 2 to 4, wherein $M^+$ is $H^+$.

6. The electrolyte material according to claim 3, wherein at least one type of the repeating units represented by the formula (u1) are repeating units represented by the following formula (u1-1):

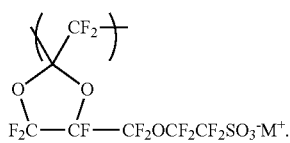

(u1-1)

7. The electrolyte material according to claim 1, wherein at least one type of the repeating units (B) are repeating units represented by the following formula (u2):

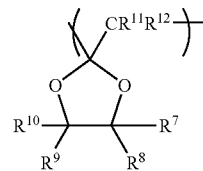

(u2)

wherein each of $R^7$ to $R^{12}$ which are independent of one another, is a monovalent perfluoroorganic group which optionally has an etheric oxygen atom, or a fluorine atom.

8. The electrolyte material according to claim 7, wherein at least one type of the repeating units represented by the formula (u2) are repeating units represented by the following formula (u2-1):

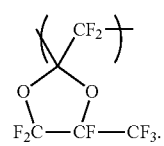

(u2-1)

9. A liquid composition comprising a dispersion medium and the electrolyte material as defined in claim 1 dispersed in the dispersion medium, wherein the dispersion medium contains an organic solvent having a hydroxy group.

10. A membrane/electrode assembly for a polymer electrolyte fuel cell, which comprises an anode having a catalyst layer containing a proton conductive polymer, a cathode having a catalyst layer containing a proton conductive polymer, and a polymer electrolyte membrane disposed between the anode and the cathode, wherein the proton conductive polymer contained in the catalyst layer of at least one of the cathode and the anode is the electrolyte material as defined in claim 1.

11. The electrolyte material according to claim 1, wherein the ion exchange capacity is from 1.5 to 3.8 meq/g dry resin.

12. The electrolyte material according to claim 1, wherein TQ is at least 230° C.

13. The electrolyte material according to claim 1, wherein TQ is at least 250° C.

* * * * *